US008154996B2

(12) United States Patent  
Godbole et al.

(10) Patent No.: US 8,154,996 B2  
(45) Date of Patent: Apr. 10, 2012

(54) METHODS AND APPARATUS FOR FLOW CONTROL ASSOCIATED WITH MULTI-STAGED QUEUES

(75) Inventors: Avanindra Godbole, San Jose, CA (US); Pradeep Sindhu, Los Altos Hills, CA (US); Jean-Marc Frailong, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 90 days.

(21) Appl. No.: 12/242,224

(22) Filed: Sep. 30, 2008

(65) Prior Publication Data

US 2010/0061238 A1   Mar. 11, 2010

Related U.S. Application Data

(60) Provisional application No. 61/096,209, filed on Sep. 11, 2008.

(51) Int. Cl.  
*H04L 12/24* (2006.01)

(52) U.S. Cl. ........................................ 370/229; 370/412

(58) Field of Classification Search .......... 370/411–417, 370/395.71  
See application file for complete search history.

(56) References Cited

U.S. PATENT DOCUMENTS

| | | | |
|---|---|---|---|
| 5,457,687 A | 10/1995 | Newman | |
| 5,926,473 A | 7/1999 | Gridley | |
| 5,987,008 A | 11/1999 | Simpson et al. | |
| 5,987,028 A | 11/1999 | Yang et al. | |
| 5,991,295 A | 11/1999 | Tout et al. | |
| 6,049,546 A | 4/2000 | Ramakrishnan | |
| 6,073,089 A | 6/2000 | Baker et al. | |
| 6,324,165 B1 | 11/2001 | Fan et al. | |
| 6,370,145 B1 | 4/2002 | Dally et al. | |
| 6,438,107 B1 | 8/2002 | Somiya et al. | |
| 6,512,747 B1 | 1/2003 | Umeuchi et al. | |
| 6,618,357 B1 * | 9/2003 | Geyer et al. | 370/236 |
| 6,657,962 B1 | 12/2003 | Barri et al. | |

(Continued)

FOREIGN PATENT DOCUMENTS

EP         1 892 905 A1     2/2008

(Continued)

OTHER PUBLICATIONS

Search Report for European Application No. 09170041.9, mailed Nov. 23, 2009 (8 pages).

(Continued)

*Primary Examiner* — Kwang B Yao  
*Assistant Examiner* — Juvena Loo  
(74) *Attorney, Agent, or Firm* — Cooley LLP

(57) ABSTRACT

In one embodiment, a method, comprising receiving at a receive side of a physical link a request to suspend transmission of data from a queue within a transmit side of a first stage of queues and to suspend transmission via a path including the physical link, a portion of the first stage of queues, and a portion of a second stage of queues. The method includes sending, in response to the request, a flow control signal to a flow control module configured to schedule transmission of the data from the queue within the transmit side of the first stage of queues. The flow control signal is associated with a first control loop including the path and differing from a second control loop that excludes the first stage of queues.

19 Claims, 6 Drawing Sheets

U.S. PATENT DOCUMENTS

| | | | |
|---|---|---|---|
| 6,856,622 | B1 | 2/2005 | Calamvokis et al. |
| 6,944,173 | B1 | 9/2005 | Jones et al. |
| 6,973,032 | B1 * | 12/2005 | Casley et al. ............... 370/230 |
| 6,986,161 | B2 | 1/2006 | Billhartz |
| 7,027,457 | B1 | 4/2006 | Chiussi et al. |
| 7,046,631 | B1 * | 5/2006 | Giroux et al. ............... 370/234 |
| 7,061,862 | B2 * | 6/2006 | Horiguchi et al. ............ 370/230 |
| 7,075,934 | B2 * | 7/2006 | Chiussi et al. ........... 370/395.41 |
| 7,173,931 | B2 | 2/2007 | Chao et al. |
| 7,185,368 | B2 | 2/2007 | Copeland, III |
| 7,230,947 | B1 | 6/2007 | Huber et al. |
| 7,233,568 | B2 | 6/2007 | Goodman et al. |
| 7,234,168 | B2 | 6/2007 | Gupta et al. |
| 7,269,666 | B1 | 9/2007 | Leitner et al. |
| 7,277,429 | B2 | 10/2007 | Norman et al. |
| 7,327,680 | B1 | 2/2008 | Kloth |
| 7,391,736 | B2 | 6/2008 | Na et al. |
| 7,403,524 | B2 | 7/2008 | Hill |
| 7,424,744 | B1 | 9/2008 | Wu et al. |
| 7,430,175 | B2 | 9/2008 | Dropps et al. |
| 7,457,245 | B2 | 11/2008 | McAlpine et al. |
| 7,519,860 | B2 | 4/2009 | Hatonen et al. |
| 7,540,025 | B2 | 5/2009 | Tzadikario |
| 7,543,052 | B1 | 6/2009 | Cesa Klein |
| 7,719,982 | B2 | 5/2010 | Varma |
| 2002/0064170 | A1 | 5/2002 | Siu et al. |
| 2002/0075883 | A1 | 6/2002 | Dell et al. |
| 2002/0080789 | A1 | 6/2002 | Henderson et al. |
| 2002/0118692 | A1 | 8/2002 | Oberman et al. |
| 2002/0154637 | A1 | 10/2002 | Keller-Tuberg |
| 2002/0167950 | A1 | 11/2002 | Chang et al. |
| 2003/0005145 | A1 | 1/2003 | Bullard |
| 2003/0026287 | A1 | 2/2003 | Mullendore et al. |
| 2003/0035432 | A1 | 2/2003 | Sreejith et al. |
| 2003/0058880 | A1 * | 3/2003 | Sarkinen et al. ............ 370/413 |
| 2003/0063348 | A1 | 4/2003 | Posey, Jr. |
| 2003/0218977 | A1 | 11/2003 | Pan et al. |
| 2004/0001433 | A1 | 1/2004 | Gram et al. |
| 2004/0013124 | A1 * | 1/2004 | Peebles et al. ............... 370/412 |
| 2004/0165598 | A1 | 8/2004 | Shrimali et al. |
| 2005/0036502 | A1 | 2/2005 | Blanc et al. |
| 2005/0111460 | A1 | 5/2005 | Sahita |
| 2005/0138238 | A1 | 6/2005 | Tierney et al. |
| 2005/0138243 | A1 | 6/2005 | Tierney et al. |
| 2005/0210533 | A1 | 9/2005 | Copeland et al. |
| 2005/0226156 | A1 | 10/2005 | Keating et al. |
| 2006/0104298 | A1 | 5/2006 | McAlpine et al. |
| 2006/0120289 | A1 * | 6/2006 | Cunningham ............... 370/235 |
| 2006/0123480 | A1 | 6/2006 | Oh et al. |
| 2006/0272018 | A1 | 11/2006 | Fouant |
| 2006/0285548 | A1 | 12/2006 | Hill et al. |
| 2007/0064617 | A1 | 3/2007 | Reves |
| 2007/0067438 | A1 | 3/2007 | Goranson et al. |
| 2007/0086464 | A1 | 4/2007 | Somashekhar |
| 2007/0094729 | A1 | 4/2007 | Hoefelmeyer et al. |
| 2007/0118909 | A1 | 5/2007 | Hertzog et al. |
| 2007/0150949 | A1 | 6/2007 | Futamura et al. |
| 2007/0180526 | A1 | 8/2007 | Copeland, III |
| 2007/0192861 | A1 | 8/2007 | Varghese et al. |
| 2007/0240207 | A1 | 10/2007 | Belakhdar et al. |
| 2007/0268830 | A1 | 11/2007 | Li et al. |
| 2008/0080548 | A1 | 4/2008 | Mullendore et al. |
| 2008/0082977 | A1 | 4/2008 | Araujo et al. |
| 2008/0151863 | A1 | 6/2008 | Lawrence et al. |
| 2008/0253289 | A1 | 10/2008 | Naven et al. |
| 2008/0259798 | A1 * | 10/2008 | Loh et al. .................. 370/235 |
| 2008/0263661 | A1 | 10/2008 | Bouzida |
| 2008/0285449 | A1 | 11/2008 | Larsson et al. |
| 2009/0003212 | A1 | 1/2009 | Kwan et al. |
| 2009/0077663 | A1 | 3/2009 | Sun et al. |
| 2009/0300209 | A1 | 12/2009 | Elzur |
| 2010/0061239 | A1 | 3/2010 | Godbole et al. |
| 2010/0061390 | A1 | 3/2010 | Godbole et al. |
| 2010/0158031 | A1 | 6/2010 | Thomas et al. |
| 2010/0165843 | A1 | 7/2010 | Thomas |
| 2011/0154132 | A1 | 6/2011 | Aybay |

FOREIGN PATENT DOCUMENTS

| | | |
|---|---|---|
| GB | 2 361 139 A | 10/2001 |
| WO | WO 97/04546 | 2/1997 |

OTHER PUBLICATIONS

Office Action mailed Mar. 29, 2010 for U.S. Appl. No. 12/242,230 (11 pages).

Office Action mailed Apr. 29, 2010 for U.S. Appl. No. 12/343,728 (21 pages).

Office Action mailed May 11, 2010 for U.S. Appl. No. 12/345,490 (12 pages).

F.K. Liotopoulos et al., "A Modular, 160 Gbps ATM Switch Architecture for Multimedia Networking Support, based on a 3-Stage Clos Network," Proceedings of the International Teletraffic Congress, ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

William J. Daily, "Virtual-Channel Flow Control," IEEE Transactions on Parallel and Distributed Systems, vol. 3, No. 2, Mar. 1992, pp. 194-205.

U.S. Appl. No. 12/345,490, filed Dec. 29, 2008, entitled "Flow-Control in a Switch Fabric" (38 pgs).

U.S. Appl. No. 12/646,114, filed Dec. 23, 2009, entitled "Methods and Apparatus for Tracking Data Flow Based on Flow State Values" (50 pgs).

U.S. Appl. No. 12/771,413, filed Apr. 30, 2010, entitled "Methods and Apparatus for Flow Control Associated with a Switch Fabric" (44 pgs).

U.S. Appl. No. 12/820,797, filed Jun. 22, 2010, entitled "Methods and Apparatus for Virtual Channel Flow Control Associated with a Switch Fabric" (54 pgs).

Office Action mailed Oct. 15, 2010 for U.S. Appl. No. 12/343,728 (22 pages).

Office Action mailed May 2, 2011 for U.S. Appl. No. 12/343,728 (22 pgs).

Office Action mailed Sep. 17, 2010 for U.S. Appl. No. 12/242,230 (16 pages).

Office Action mailed Mar. 17, 2011 for U.S. Appl. No. 12/242,230 (11 pages).

Office Action mailed Oct. 15, 2010 for U.S. Appl. No. 12/345,490 (14 pages).

Office Action mailed Apr. 1, 2011 for U.S. Appl. No. 12/345,490 (14 pages).

Office Action mailed May 23, 2011 for U.S. Appl. No. 12/558,118 (6 pages).

Final Office Action mailed Oct. 7, 2011 for U.S. Appl. No. 12/343,728 (25 pgs).

Office Action mailed Oct. 6, 2011 for U.S. Appl. No. 12/242,230 (19 pages).

Office Action mailed Aug. 19, 2011 for U.S. Appl. No. 12/345,490 (14 pages).

* cited by examiner

METHODS AND APPARATUS FOR FLOW CONTROL ASSOCIATED WITH MULTI-STAGED QUEUES

RELATED APPLICATION

This application claims priority to the commonly owned U.S. Provisional Patent Application No. 61/096,209, entitled "Methods and Apparatus Related to Flow Control within a Data Center," filed on Sep. 11, 2008, which is incorporated herein by reference in its entirety. This application is related to a co-pending U.S. patent application 12/242,230, filed on even date herewith, entitled "Methods and Apparatus for Flow-Controllable Multi-Staged Queues," which is incorporated herein by reference in its entirety.

BACKGROUND

Embodiments described herein relate generally to flow control, and, in particular, to flow control associated with multi-staged queues.

Transmission of data from a transmitter to a receiver via a physical link (e.g., an Ethernet link) can be, for example, disrupted because of congestion at a queue configured to receive the data. In some instances, the disruption can cause head-of-line (HOL) blocking and/or result in the loss of at least portions of the data due to buffer overflow. Known flow control protocols such as Ethernet pause (Institute of Electrical and Electronics Engineers (IEEE) 802.3x) and priority pause (IEEE 802.1qbb) can be used to substantially prevent buffer overflow in some applications, and quantized congestion notification (QCN) (IEEE 802.1qau) can be used for management of data congestion within a multi-hop network that has relatively steady data flows. These known flow control protocols, however, may not adequately resolve congestion issues related to multi-stage queues and/or may not adequately handle the onset of congestion within a hop-by-hop network link caused by, for example, bursts of data.

Thus, a need exists for methods and apparatus for data flow control between multi-stage queues associated with a hop-by-hop network link.

SUMMARY OF THE INVENTION

In one embodiment, a method, comprising receiving at a receive side of a physical link a request to suspend transmission of data from a queue within a transmit side of a first stage of queues and to suspend transmission via a path including the physical link, a portion of the first stage of queues, and a portion of a second stage of queues. The method includes sending, in response to the request, a flow control signal to a flow control module configured to schedule transmission of the data from the queue within the transmit side of the first stage of queues. The flow control signal is associated with a first control loop including the path and differing from a second control loop that excludes the first stage of queues.

DETAILED DESCRIPTION

Figure 1:
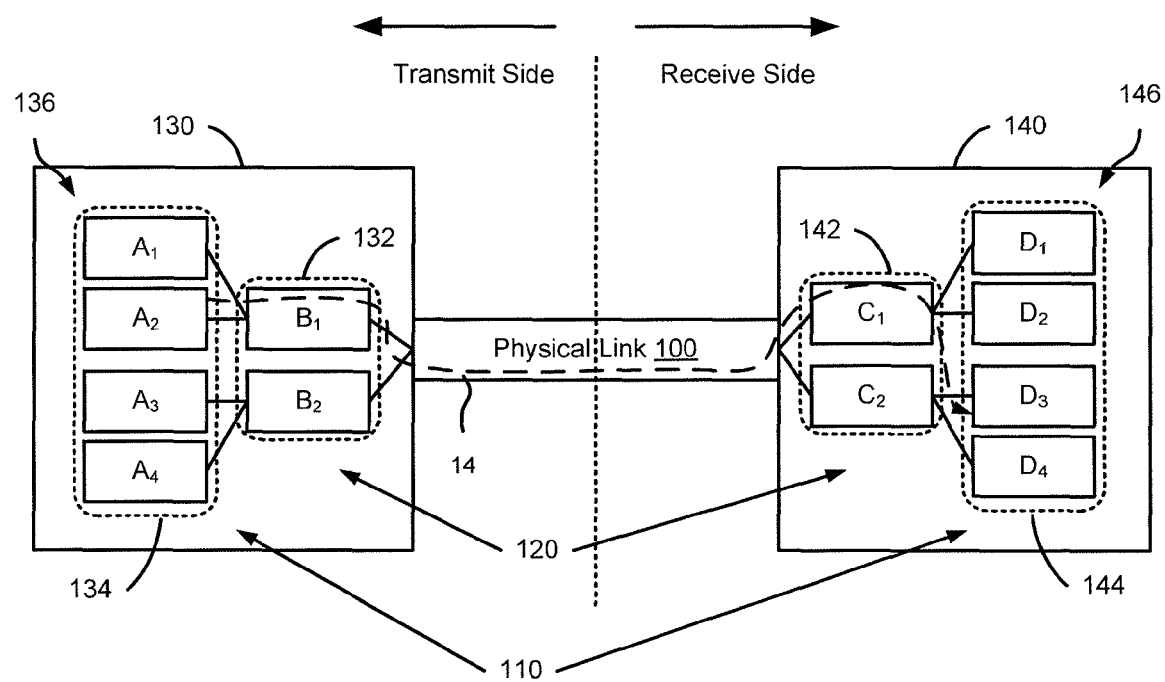
FIG. 1 is a schematic block diagram that illustrates multiple stages of flow-controllable queues, according to an embodiment.

Flow of data (e.g., a data packet such as an internet protocol (IP) packet) via a link between stages of queues at a source entity and stages of queues a destination entity can be controlled based on flow control signaling associated with multiple flow control loops. For example, if the destination entity (or a portion thereof) is unable to handle a flow of data from the source entity because the destination entity has limited buffering capability relative to the amount of data being sent, the destination entity can send a flow control signal associated with at least one of the flow control loops to the source entity. The flow control signal can be configured to trigger the source entity to suspend transmission of the flow of data to the destination entity. In some embodiments, the link between the source entity and the destination entity can be a physical link and can be associated with a single network hop (e.g., a network step that cannot be defined topographically, or a network step associated with a link between one media access control (MAC) device and another MAC device). In some embodiments, the source entity can be referred to as a transmitter and a destination entity can be referred to as a receiver.

Flow control loops associated with a link can be defined so that flow control signaling associated with the flow control loops can affect different portions of stages of queues spanning the link. For example, a flow control signal associated with a first flow control loop can trigger suspension of data transmission from a first stage queue and all second stage queues that fan into the first stage queue. A flow control signal associated with a different flow control loop can trigger suspension of data transmission from less than all of the second stage queues that fan into the first stage queue. In some embodiments, data received at one or more of the second stage queues that fan into the first stage queue can be from different (e.g., independent) network devices. In sum, the flow control signal associated with the second flow control loop can trigger different (e.g., more granular) data flow control than the flow control signal associated with the first flow control loop.

In some embodiments, a flow control module associated with one or more stages of queues can be configured to define a flow control signal associated with a flow control loop and/or can be configured to execute a flow-related action (e.g., suspend transmission of data) based on one or more parameter values associated with a flow control signal. In some embodiments, one or more parameter values associated with a flow control signal can be stored at the destination entity and/or a source entity. The stored parameter value(s) can be used to define another flow control signal and/or can be used to modify and/or schedule transmission of data from the source entity to the destination entity. In some embodiments, a flow control packet that includes parameter values related to several queues within a stage of queues can be communicated from a destination entity to a source entity via a flow control signal. In some embodiments, a flow control signal can be configured to indicate that at least a portion of a destination entity is available to receive data.

FIG. 1 is a schematic block diagram that illustrates multiple stages of flow-controllable queues, according to an embodiment. As shown in FIG. 1, a transmit side of a first stage of queues 110 and a transmit side of a second stage of queues 120 are included in a source entity 130 on a transmit side of a physical link 100. A receive side of the first stage of queues 110 and a receive side of the second stage of queues 120 are included in a destination entity 140 on a receive side of the physical link 100. The source entity 130 and/or the destination entity 140 can be any type of computing device (e.g., a server, a personal computer, a router, a multi-stage switch) that can be configured to receive and/or transmit data via the physical link 100. In some embodiments, the source entity 130 and/or the destination entity 140 can be associated with a data center. More details related to flow-controllable queues within a data center are discussed in connection with FIG. 6.

As shown in FIG. 1, the first stage of queues 110 includes transmit queues $A_1$ through $A_4$ on the transmit side of the physical link 100 (referred to as first-stage transmit queues 134) and receive queues $D_1$ through $D_4$ on the receive side of the physical link 100 (referred to as first-stage receive queues 144). The second stage of queues 120 includes transmit queues $B_1$ and $B_2$ on the transmit side of the physical link 100 (referred to as second-stage transmit queues 132) and receive queues $C_1$ and $C_2$ on the receive side of the physical link 100 (referred to as second-stage receive queues 142).

Flow of data via the physical link 100 can be controlled (e.g., modified, suspended) based on flow control signaling associated with flow control loops between the source entity 130 and the destination entity 140. For example, data transmitted from the source entity 130 on the transmit side of the physical link 100 can be received at the destination entity 140 on the receive side of the physical link 100. A flow control signal can be defined at and/or sent from the destination entity 140 to the source entity 130 when the destination entity 140 is unavailable to receive data from source entity 130 via the physical link 100. The flow control signal can be configured to trigger the source entity 130 to modify the flow of the data from the source entity 130 to the destination entity 140.

For example, if receive queue $D_2$ is unavailable to handle data transmitted from transmit queue $A_1$, the destination entity 140 can be configured to send a flow control signal associated with a flow control loop to the source entity 130; the flow control signal can be configured to trigger suspension of transmission of data from the transmit queue $A_1$ to the receive queue $D_2$ via a transmission path that includes at least a portion of the second stage of queues 120 and the physical link 100. In some embodiments, the receive queue $D_2$ can be unavailable, for example, when the receive queue $D_2$ is too full to receive data. In some embodiments, the receive queue D2 can change from an available state to an unavailable state (e.g., a congestion state) in response to data previously received from the transmit queue $A_1$. In some embodiments, transmit queue $A_1$ can be referred to as a target of the flow control signal. The transmit queue $A_1$ can be identified within the flow control signal based on a queue identifier associated with the transmit queue $A_1$. In some embodiments, the flow control signal can be referred to as a feedback signal.

In this embodiment, a flow control loop is associated with the physical link 100 (referred to as a physical link control loop), a flow control loop is associated with first the stages of queues 110 (referred to as a first stage control loop), and a flow control loop is associated with the second stage of queues 120 (referred to as a second stage control loop). Specifically, the physical link control loop is associated with a transmission path that includes the physical link 100, and excludes the first stage of queues 110 as well as the second stage of queues 120. Flow of data via the physical link 100 can be turned on and turned off based on flow control signaling associated with the physical link control loop.

The first stage control loop can be based on transmission of data from at least one of the transmit queues 134 within the second stage of queues 110 and a flow control signal defined based on an availability of (e.g., an indicator of an availability of) at least one of the receive queues 144 within the first stage of queues 110. Thus, the first stage control loop can be referred to as being associated with the first stage of queues 110. The first stage control loop can be associated with a transmission path that includes the physical link 100, at least a portion of the second stage of queues 120, and at least a portion of the first stage of queues 110. Flow control signaling associated with the first stage control loop can trigger control of data flow from transmit queues 134 associated with the first stage of queues 110.

The second stage control loop can be associated with a transmission path that includes the physical link 100 and includes at least a portion of the second stage of queues 120, but excludes the first stage of queues 110. The second stage control loop can be based on transmission of data from at least one of the transmit queues 132 within the second stage of queues 120 and a flow control signal defined based on an availability of (e.g., an indicator of an availability of) at least one of the receive queues 142 within the second stage of queues 120. Thus, the second stage control loop can be referred to as being associated with the second stage of queues 120. Flow control signaling associated with the second stage control loop can trigger control of data flow from transmit queues 132 associated with the second stage of queues 120.

In this embodiment, the flow control loop associated with the second stage of queues 120 is a priority-based flow control loop. Specifically, each transmit queue from the second-stage transmit queues 132 is paired with a receive queue from the second-stage receive queues 142; and each queue pair is associated with a level of service (also can be referred to as a class of service or quality of service). In this embodiment, second-stage transmit queue $B_1$ and second-stage transmit queue $C_1$ define a queue pair and are associated with level of service X. The second-stage transmit queue $B_2$ and second-stage transmit queue $C_2$ define a queue pair and are associated with service level Y. In some embodiments, different types of network traffic can be associated with a different level of service (and, thus a different priority). For example, storage traffic (e.g., read and write traffic), inter-processor communication, media signaling, session layer signaling, and so forth each can be associated with at least one level of service. In some embodiments, the second stage control loop can be based on, for example, the Institute of Electrical and Electronics Engineers (IEEE) 802.1qbb protocol, which defines a priority-based flow control strategy.

Flow of data via a transmission path 14, shown in FIG. 1, can be controlled using at least one of the control loops. Transmission path 14 includes first-stage transmit queue $A_2$, second-stage transmit queue $B_1$, the physical link 100, second-stage receive queue $C_1$, and first-stage receive queue $D_3$. Changes in data flow via a queue in one stage of the transmission path 14 based on a flow control loop associated with that stage, however, can impact data flow through another stage of the transmission path 14. Flow control at one stage can affect data flow at another stage because the queues (e.g., transmit queues 132, transmit queues 134) within the source entity 130 and the queues (e.g., receive queues 142, receive queues 144) within the destination entity 140 are staged. In other words, flow control based on one flow control loop can have an impact on flow of data via elements associated with a different flow control loop.

For example, flow of data from first-stage transmit queue $A_1$ via transmission path 14 to first-stage receive queue $D_3$ can be modified based on one or more of the control loops—the first stage control loop, the second stage control loop, and/or the physical link control loop. Suspension of data flow to the first-stage receive queue $D_3$ may be triggered because the first-stage receive queue $D_3$ may have changed from an available state to an unavailable state (e.g., a congestion state).

If the data flowing to first-stage receive queue $D_3$ is associated with level of service X, the flow of data via second-stage transmit queue $B_1$ and second-stage receive queue $C_1$ (which define the queue pair associated with level of service X) can be suspended based on flow control signaling associated with the second stage control loop (which is a priority-based control loop). But suspending transmission of data via the queue pair associated with level of service X can result in suspension of data transmissions from transmit queues that fan into the second-stage transmit queue $B_1$. Specifically, suspending transmission of data via the queue pair associated with level of service X can result in suspension of data transmissions from not only first-stage transmit queue $A_2$, but also of data transmissions from first-stage transmit queue $A_1$. In other words, flow of data from the first-stage transmit queue $A_1$ is indirectly or collaterally affected. In some embodiments, data received at transmit queue $A_1$ and data received at transmit queue $A_2$ can be associated with the same level of service X, but the data received at transmit queue $A_1$ and the data received at transmit queue $A_2$ may be from, for example, from different (e.g., independent) network devices (not shown) that can be associated with a different level of service.

The data flowing to first-stage receive queue $D_3$ can also be suspended by specifically suspending transmission of data from the first-stage transmit queue $A_2$ based on flow control signaling associated with the first stage control loop. By directly suspending transmission of data from the first-stage transmit queue $A_2$, data transmissions from first-stage transmit queue $A_1$ may not be disrupted. In other words, flow control of the first-stage transmit queue $A_2$ can be directly controlled based on a flow control signal associated with the first stage control loop without suspending data transmission from other first-stage transmit queues such as the first-stage transmit queue $A_1$.

Flow of data to first-stage receive queue $D_3$ can also be controlled by suspending transmission of data via the physical link 100 based on flow control signaling associated with the physical link control loop. But suspending transmission of data via the physical link 100 can result in suspension of all data transmissions via the physical link 100.

The queues on the transmit side of the physical link 100 can be referred to as transmit queues 136 and the queues on the receive side of the physical link can be referred to as receive queues 146. In some embodiments, the transmit queues 136 can also be referred to as source queues, and the receive queues 146 can be referred to as destination queues. Although not shown, in some embodiments, one or more of the transmit queues 136 can be included in one or more interface cards associated with the source entity 130, and one or more of the receive queues 146 can be included in one or more interface cards associated with the destination entity 140.

When source entity 130 transmits data via the physical link 100, source entity 130 can be referred to as a transmitter disposed on a transmit side of the physical link 100. Destination entity 140 can be configured to receive the data and can be referred to as a receiver disposed on a receive side of the physical link 100. Although not shown, in some embodiments, the source entity 130 (and associated elements (e.g., transmit queues 136)) can be configured to function as a destination entity (e.g., a receiver) and the destination entity 140 (and associated elements (e.g., receive queues 146)) can be configured to function as a source entity (e.g., a transmitter). Moreover, the physical link 100 can function as a bidirectional link.

In some embodiments, the physical link 100 can be a tangible link such as an optical link (e.g., a fiber optic cable, a plastic fiber cable), a cable link (e.g., a copper-based wire), a twisted pair link (e.g., a category-5 cable), and so forth. In some embodiments, the physical link 100 can be a wireless link. Data transmissions via the physical link 100 can be defined based on a protocol such as an Ethernet protocol, a wireless protocol, and so forth.

In some embodiments, the second stage control loop can be referred to as being nested within the first stage control loop because the second stage of queues 120, which is associated with the second stage control loop, is disposed inside of the first stage of queues 110, which is associated with the first stage control loop. Similarly, the physical link control loop can be referred to as being nested within the second stage control loop. In some embodiments, the second stage control loop can be referred to as an inner control loop and the first stage control loop can be referred to as an outer control loop.

Figure 2:
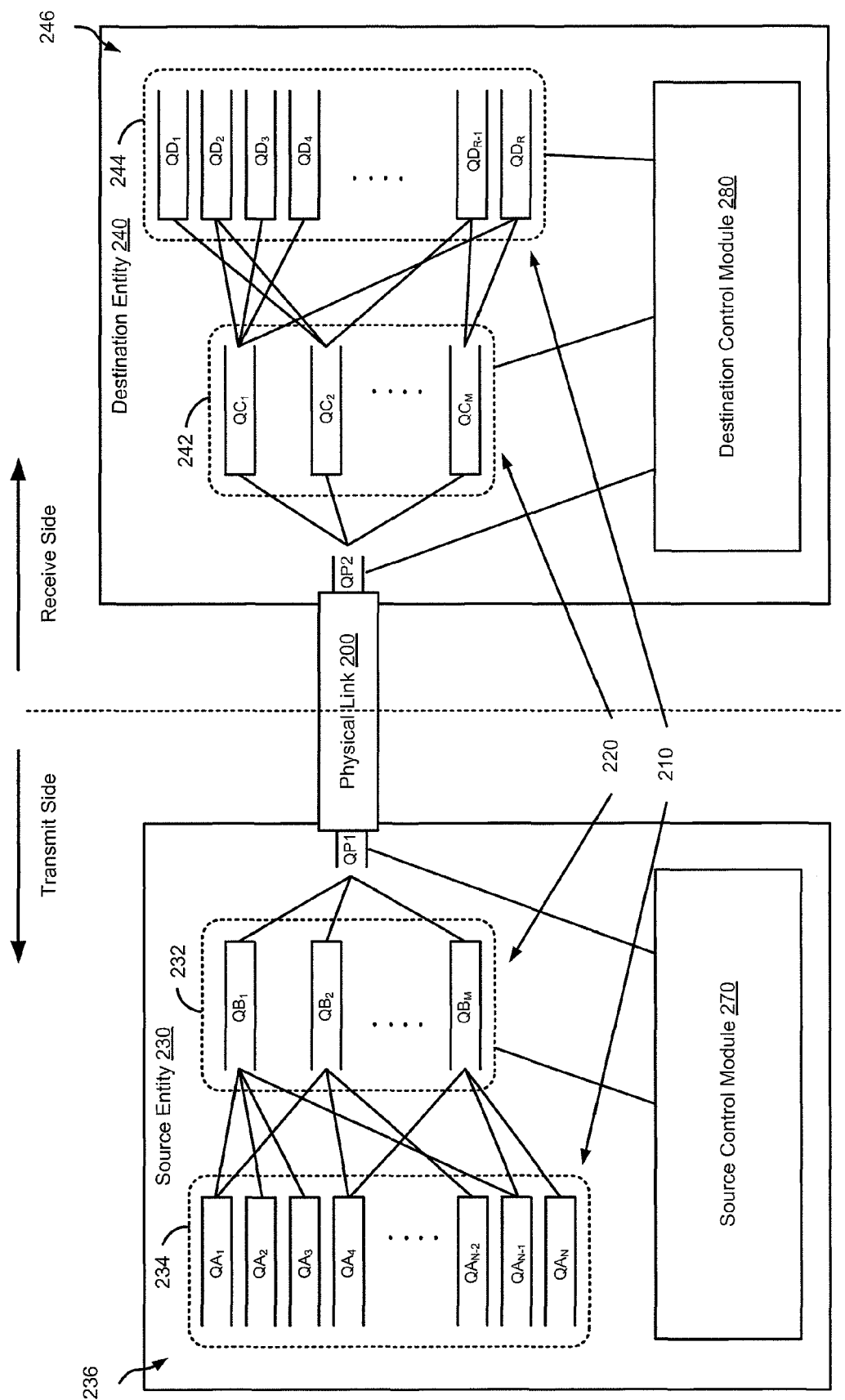
FIG. 2 is a schematic block diagram that illustrates multiple stages of flow-controllable queues, according to another embodiment.

FIG. 2 is a schematic block diagram that illustrates multiple stages of flow-controllable queues, according to an embodiment. As shown in FIG. 2, a transmit side of a first stage of queues 210 and a transmit side of a second stage of queues 220 are included in a source entity 230 disposed on a transmit side of a physical link 200. A receive side of the first stage of queues 210 and a receive side of the second stage of queues 220 are included in a destination entity 240 disposed on a receive side of the physical link 200. The queues on the transmit side of the physical link 200 can collectively be referred to as transmit queues 236 and the queues on the receive side of the physical link can collectively be referred to as receive queues 246. Although not shown, in some embodiments, the source entity 230 can be configured to function as a destination entity, and the destination entity 240 can be configured to function as a source entity (e.g., a transmitter). Moreover, the physical link 200 can function as a bidirectional link.

As shown in FIG. 2, source entity 230 is in communication with destination entity 240 via the physical link 200. Source entity 230 has a queue QP1 configured to buffer data (if necessary) before the data is transmitted via the physical link 200, and destination entity 240 has a queue QP2 configured to buffer data (if necessary) received via the physical link 200 before the data is distributed at the destination entity 240. In some embodiments, flow of data via the physical link 200 can be handled without the buffers queue QP1 and queue QP2.

Transmit queues $QA_1$ through $QA_N$, which are included the first stage of queues 210, can each be referred to as a first-stage transmit queue and can collectively be referred to as transmit queues 234 (or as queues 234). Transmit queues $QB_1$ through $QB_M$, which are included in the second stage of queues 220, can each be referred to as a second-stage transmit queue and can collectively be referred to as transmit queues 232 (or as queues 232). Receive queues $QD_1$ through $QD_R$, which are included in the first stage of queues 210, can each be referred to as a first-stage receive queue and can collectively be referred to as receive queues 244 (or as queues 244). Receive queues $QC_1$ through $QC_M$, which are in the second stage of queues 220, can each be referred to as a second-stage receive queue and can collectively be referred to as receive queues 242 (or as queues 242).

As shown in FIG. 2, each queue from the second stage of queues 220 is disposed within a transmission path between the physical link 200 and at least one queue from the first stage of queues 210. For example, a portion of a transmission path can be defined by first-stage receive queue $QD_4$, second-stage receive queue $QC_1$, and the physical link 200. Second-stage receive queue $QC_1$ is disposed within the transmission path between first-stage receive queue $QD_4$ and the physical link 200.

In this embodiment, a physical link control loop is associated with the physical link 200, a first stage control loop is associated with first the stages of queues 210, and a second stage control loop is associated with the second stage of queues 220. In some embodiments, the second stage control loop can be priority-based control loop. In some embodiments, the physical link control loop can include the physical link 200, queue QP1, and queue QP2.

Flow control signals can be defined at and/or transmitted between a source control module 270 at the source entity 230 and a destination control module 280 at the destination entity 240. In some embodiments, the source control module 270 can be referred to as a source flow control module, and the destination control module 280 can be referred to as a destination flow control module. For example, destination control module 280 can be configured to send a flow control signal to source control module 270 when one or more of the receive queues 246 (e.g., receive queue $QD_2$) at the destination entity 240 is unavailable to receive data. The flow control signal can be configured to trigger source control module 270 to, for example, suspend the flow of data from one or more of the receive queues 236 to the one or more receive queues 246.

A queue identifier can be associated with data queued at a transmit queue from the transmit queues 236 by the source control module 270 before the data is transmitted. The queue identifier can represent and/or can be used to identify the transmit queue where the data is being queued. For example, when a data packet is queued at first-stage transmit queue $QA_4$, a queue identifier uniquely identifying first-stage transmit queue $QA_4$ can be appended to the data packet or included in a field (e.g., a header portion, a trailer portion, a payload portion) within the data packet. In some embodiments, the queue identifier can be associated with data at the source control module 270, or triggered by the source control module 270. In some embodiments, the queue identifier can be associated with data just before the data is transmitted, or after the data has been transmitted from one of the transmit queues 236.

The queue identifier can be associated with data transmitted from the transmit side of the physical link 200 to the receive side of the physical link 200 so that the source of the data (e.g., the source queue) can be identified. Accordingly, a flow control signal can be defined to suspend transmission of one or more of the transmit queues 236 based on the queue identifier. For example, a queue identifier associated with first-stage transmit queue $QA_N$ can be included in a data packet transmitted from first-stage transmit queue $QA_N$ to first-stage receive queue $QD_3$. If after receiving the data packet, first-stage receive queue $QD_3$ is unable to receive another data packet from first-stage transmit queue $QA_N$, a flow control signal requesting that first-stage transmit queue $QA_N$ suspend transmission of additional data packets to first-stage receive queue $QD_3$ can be defined based on the queue identifier associated with first-stage transmit queue $QA_N$. The queue identifier can be parsed from the data packet by the destination control module 280 and used by the destination control module 280 to define the flow control signal.

In some embodiments, data transmissions to first-stage receive queue $QD_R$ from several of the transmit queues 236 (e.g., first-stage transmit queues 234) can be suspended in response to the first-stage receive queue $QD_R$ changing from an available state to an unavailable state. Each of the several transmit queues 236 can be identified within a flow control signal based on their respective queue identifiers.

In some embodiments, one or more of the transmit queues 236 and/or one or more of the receive queues 246 can be a virtual queue (e.g., a logically defined group of queues). Accordingly, a queue identifier can be associated with (e.g., can represent) the virtual queue. In some embodiments, a queue identifier can be associated with a queue from a set of queues that define a virtual queue. In some embodiments, each queue identifier from a set of queue identifiers associated with the physical link 200 can be unique. For example, each transmit queues 236, which are associated with the physical link 200 (e.g., associated with a hop), can be associated with a unique queue identifier.

In some embodiments, the source control module 270 can be configured to associate a queue identifier with only a specified subset of the transmit queues 236 and/or only a subset of data queued at one of the transmit queues 236. For example, if data is transmitted from first-stage transmit queue $QA_2$ to first-stage receive queue $QD_1$ without a queue identifier, a flow control signal configured to request that transmission of data from first-stage transmit queue $QA_2$ be suspended may not be defined because the source of the data may not be known. Accordingly, a transmit queue from the transmit queues 236 can be exempted from flow control by not associating (e.g., omitting) a queue identifier with data when the data is transmitted from the transmit queue.

In some embodiments, the unavailability of one or more of the receive queues 246 at the destination entity 240 can be defined based on a condition being satisfied. The condition can be related to a storage limit of a queue, a queue access rate, a flow rate of data into the queue, and so forth. For example, a flow control signal can be defined at the destination control module 280 in response to a status of one or more of the receive queues 246 such as second-stage receive queue $QC_2$ changing from an available state to an unavailable state (e.g., a congestion state) based on a threshold storage limit being exceeded. The second-stage receive queue $QC_2$ can be unavailable to receive data when in the unavailable state because, for example, the second-stage receive queue $QC_2$ is considered too full (as indicated by the threshold storage limit being exceeded). In some embodiments, one or more of the receive queue 246 can be in an unavailable state when disabled. In some embodiments, the flow control signal can be defined based on a request to suspend transmission of data to a receive queue from the receive queues 246 when the receive queue is unavailable to receive data. In some embodiments, the status of one or more of the receive queues 246 can be changed from an available state to a congestion state (by destination control module 280) in response to a specified subset of receive queues 246 (e.g., receive queues within a specified stage) being in a congestion state.

In some embodiments, a flow control signal can be defined at the destination control module 280 to indicate that one of the receive queues 246 has changed from an unavailable state to an available state. For example, initially, the destination control module 280 can be configured to define and send a first flow control signal to the source control module 270 in response to first-stage receive queue $QD_3$ changing from an available state to an unavailable state. The first-stage receive queue $QD_3$ can change from the available state to the unavailable state in response to data sent from first-stage transmit queue $QA_2$. Accordingly, the target of the first flow control signal can be first-stage transmit queue $QA_2$ (as indicated based on a queue identifier). When the first-stage receive queue $QD_3$ changes from the unavailable state back to the available state, the destination control module 280 can be configured to define and send a second flow control signal to the source control module 270 indicating the change from the unavailable state back to the available state. In some embodiments, the source control module 270 can be configured to trigger transmission of data from one or more of the transmit queues 236 to the first-stage receive queue $QD_3$ in response to the second flow control signal.

In some embodiments, a flow control signal can have one or more parameter values that can be used by the source control module 270 to modify transmission from one of the transmit queues 236 (identified within the flow control signal by a queue identifier). For example, a flow control signal can include a parameter value that can trigger the source control module 270 to suspend transmission from one of the transmit queues 236 for a specified period of time (e.g., 10 milliseconds (ms)). In other words, the flow control signal can include a suspension-time-period parameter value. In some embodiments, the suspension time period can be indefinite. In some embodiments, the flow control signal can define a request to transmit data from one or more of the transmit queues 236 at a specified rate (e.g., specified number of frames per second, specified number of bytes per second).

In some embodiments, a flow control signal (e.g., the suspension time period within the flow control signal) can be defined based on a flow control algorithm. The suspension time period can be defined based on a time period during which a receive queue from the receive queues 246 (e.g., first-stage receive queue $QD_4$) will be unavailable. In some embodiments, the suspension time period can be defined based on more than one of the first stage receive queues 244 being unavailable. For example, in some embodiments, the suspension time period can be increased when more or less than a specified number of the first stage receive queues 244 is in a congestion state. In some embodiments, this type of determination can be made at the destination control module 280. The time period during which the receive queue will be unavailable can be a projected (e.g., predicted) time period calculated by the destination control module 280 based on, for example, a flow rate (e.g., a historic flow rate, a prior flow rate) of data from the receive queue.

In some embodiments, the source control module 270 can deny or alter a request to modify the flow of data from one or more of the transmit queues 236. For example, in some embodiments, the source control module 270 can be configured to decrease or increase a suspension time period. In some embodiments, rather than suspend transmission of data in response to a flow control signal, the source control module 270 can be configured to modify a transmission path associated with one of the transmission queues 236. For example, if first-stage transmit queue $QA_2$ has received a request to suspend transmission based on a change in status of first-stage receive queue $QD_2$, the source control module 270 can be configured to trigger transmission of data from first-stage transmit queue $QA2$ to, for example, first-stage receive queue $QD_3$ rather than comply with the request to suspend transmission.

As shown in FIG. 2, queues within the second stage of queues 220 fan into or fan out of the physical link 200. For example, transmit queues 232 (i.e., queues $QB_1$ through $QB_M$) on the transmit side of the physical link 200 fan into queue QP1 on the transmit side of physical link 200. Accordingly, data queued at any of the transmit queues 232 can be transmitted to queue QP1 of the physical link 200. On the receive side of the physical link 200, data transmitted from the physical link 200 via queue QP2 can be broadcast to receive queues 242 (i.e., queues $QC_1$ through $QC_M$).

Also, as shown in FIG. 2, transmit queues 234 within a first stage of queues 210 fan into the transmit queues 232 within the second stage of queues 220. For example, data queued at any of the first-stage transmit queues $QA_1$, $QA_4$, and $QA_{N-2}$ can be transmitted to second-stage transmit queue $QB_2$. On the receive side of the physical link 200, data transmitted from, for example, second-stage receive queue $QC_M$ can be broadcast to first-stage receive queues $QD_{R-1}$ and $QD_R$.

Because many of the flow control loops (e.g., first control loop) are associated with different fan-in and fan-out architectures, the flow control loops can have various affects on the flow of data via the physical link 200. For example, when transmission of data from the second-stage transmit queue $QB_1$ is suspended based on the second stage control loop, transmission of data from first-stage transmit queues $QA_1$, $QA_2$, $QA_3$, and $QA_{N-1}$ via the second-stage transmit queue $QB_1$ to one or more of the receive queues 246 is also suspended. In this case, transmission of data from one or more upstream queues (e.g., first-stage transmit queue $QA_1$) can be suspended when transmission from a downstream queue (e.g., second-stage transmit queue $QB_1$) is suspended. In contrast, if transmission of data from first-stage transmit queue $QA_1$ along a transmission path that includes at least downstream second-stage transmit queue $QB_1$ is suspended based on the first stage control loop, a flow rate of data from the second-stage transmit queue $QB_1$ may be decreased without entirely suspending transmission of data from second-stage transmit queue $QB_1$; first-stage transmit queue $QA_1$, for example, may still be able to transmit data via second-stage transmit queue $QB_1$.

In some embodiments, the fan-in and fan-out architecture can be different than that shown in FIG. 2. For example, in some embodiments, some of the queues within the first stage of queues 210 can be configured to fan into the physical link 200, bypassing the second stage of queues 220.

Flow control signaling associated with the transmit queues 236 is handled by the source control module 270 and flow control signaling associated with the receive queues 246 is handled by the destination control module 280. Although not shown, in some embodiments, flow control signaling can be handled by one or more control modules (or control sub-modules) that can be separate and/or integrated into a single control module. For example, flow control signaling associated with the first-stage receive queues 244 can be handled by a control module separate from a control module configured to handle flow control signaling associated with the second-stage receive queues 242. Likewise, flow control signaling associated with the first-stage transmit queues 234 can be handled by a control module separate from a control module configured to handle flow control signaling associated with the second-stage transmit queues 232. In some embodiments, one or more portions of the source control module 270 and/or the destination control module 280 can be a hardware-based module (e.g., a digital signal processor (DSP), a field programmable gate array (FPGA)) and/or a software-based module (e.g., a module of computer code, a set of processor-readable instructions that can be executed at a processor).

Figure 3:
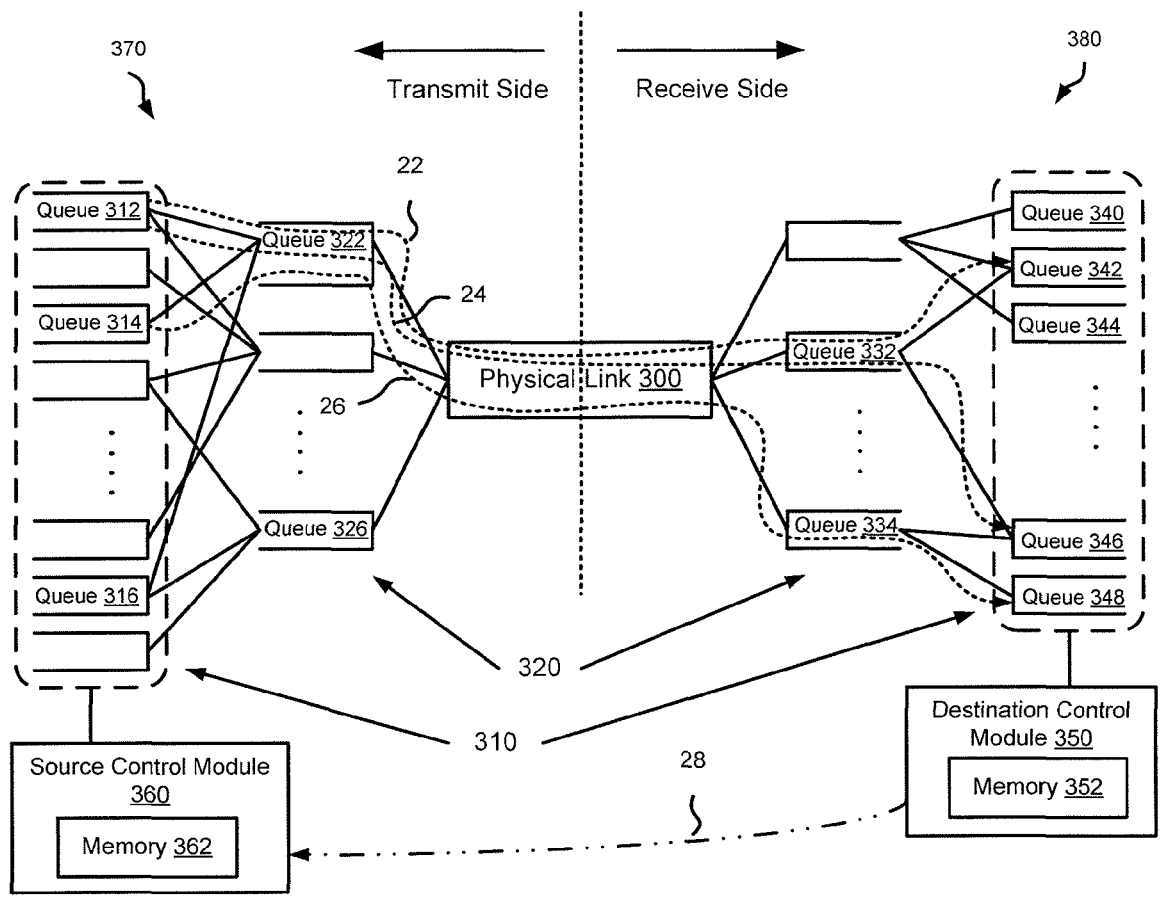
FIG. 3 is a schematic block diagram that illustrates a destination control module configured to define a flow control signal associated with multiple receive queues, according to an embodiment.

FIG. 3 is a schematic block diagram that illustrates a destination control module 350 configured to define a flow control signal 28 associated with multiple receive queues, according to an embodiment. The stages of queues include a first stage of queues 310 and a second stage of queues 320. As shown in FIG. 3, a source control module 360 is associated with a transmit side of the first stage of queues 310 and a destination control module 350 is associated with a receive side of the first stage of queues 310. The queues on the transmit side of a physical link 300 can collectively be referred to as transmit queues 370. The queues on the receive side of the physical link 300 can collectively be referred to as receive queues 380.

The destination control module 350 is configured to send the flow control signal 28 to the source control module 360 in response to one or more receive queues within the first stage of queues 310 being unavailable to receive data from a single source queue at the first stage of queues 310. The source control module 360 can be configured to suspend transmission of data from the source queue at the first stage of queues 310 to the multiple receive queues at the first stage of queues 310 based on the flow control signal 28.

The flow control signal 28 can be defined by the destination control module 280 based on information associated with each unavailable receive queue within the first stage of queues 310. The destination control module 350 can be configured to collect the information associated with the unavailable receive queues and can be configured to define the flow control signal 28 so that potentially conflicting flow control signals (not shown) will not be sent to the single source queue at the first stage of queues 310. In some embodiments, the flow control signal 28 defined based on the collection of information can be referred to as an aggregated flow control signal.

Specifically, in this example, the destination control module 350 is configured to define the flow control signal 28 in response to two receive queues—receive queue 342 and receive queue 346—at the receive side of the first stage of queues 310 being unavailable to receive data from a transmit queue 312 on the transmit side of the first stage of queues 310. In this embodiment, receive queue 342 and receive queue 346 are changed from an available state to an unavailable state in response to data packets sent from transmit queue 312 via transmission path 22 and transmission path 24, respectively. As shown in FIG. 3, transmission path 22 includes transmit queue 312, transmit queue 322 within a second stage of queues 320, the physical link 300, receive queue 332 within the second stage of queues 320, and receive queue 342. Transmission path 24 includes transmit queue 312, transmit queue 322, the physical link 300, receive queue 332, and receive queue 346.

In some embodiments, a flow control algorithm can be used to define the flow control signal 28 based on information related to the unavailability of receive queue 342 and/or information related to the unavailability of receive queue 346. For example, if destination control module 350 determines that receive queue 342 and that receive queue 346 will be unavailable for different time periods, the destination control module 350 can be configured to define the flow control signal 28 based on the different time periods. For example, the destination control module 350 can request, via the flow control signal 28, that transmission of data from transmit queue 312 be suspended for a time period calculated based on the different time periods (e.g., a time period equal to an average of the different time periods, a time period equal to the greater of the time different periods). In some embodiments, the flow control signal 28 can be defined based on individual suspension requests from the receive side of the first stage of queues 310 (e.g., a suspension request associated with receive queue 342 and a suspension request associated with receive queue 346).

In some embodiments, the flow control signal 28 can be defined based on a maximum or a minimum allowable time period. In some embodiments, the flow control signal 28 can be calculated based on an aggregate flow rate of data from, for example, transmit queue 312. For example, the suspension time period can be scaled based on the aggregate flow rate of data from transmit queue 312. In some embodiments, for example, the suspension time period can be increased if the flow rate of data from transmit queue 312 is larger than a threshold value, and the suspension time period can be decreased if the flow rate of data from transmit queue 312 is lower than a threshold value.

In some embodiments, the flow control algorithm can be configured to wait for a specified period of time before defining and/or sending the flow control signal 28. The wait time period can be defined so that multiple suspension requests related to transmit queue 312 and, which can be received at different times within the wait time period, can be used to define the flow control signal 28. In some embodiments, the wait period can be triggered in response to at least one suspension request related to transmit queue 312 being received.

In some embodiments, the flow control signal 28 can be defined by a flow control algorithm based on a priority value associated with each receive queue within the first stage of queues 310. For example, if receive queue 342 has a priority value that is higher than a priority value associated with receive queue 346, the destination control module 350 can be configured to define the flow control signal 28 based on information associated with receive queue 342 rather than receive queue 346. For example, the flow control signal 28 can be defined based on a suspension time period associated with receive queue 342 rather than a suspension time period associated with receive queue 346 because receive queue 342 can have a higher priority value than a priority value associated with receive queue 346.

In some embodiments, the flow control signal 28 can be defined by a flow control algorithm based on an attribute associated with each receive queue within the first stage of queues 310. For example, the flow control signal 28 can be defined based on receive queue 342 and/or receive queue 346 being a specified type of queue (e.g., a last-in-first-out (LIFO) queue, a first-in-first-out (FIFO) queue). In some embodiments, the flow control signal 28 can be defined based on receive queue 342 and/or receive queue 346 being configured to receive a specified type of data (e.g., a control data/signal queue, a media data/signal queue).

Although not shown, one or more control modules associated with a stage of queues (e.g., the first stage of queues 310) can be configured to send information to a different control module where the information can be used to define a flow control signal. The different control module can be associated with a different stage of queues. For example, a suspension request associated with receive queue 342 and a suspension request associated with receive queue 346 can be defined at destination control module 350. The suspension requests can be sent to a destination control module (not shown) associated with a receive side of the second stage of queues 320. A flow control signal (not shown) can be defined at the destination control module associated with the receive side of the second stage of queues 320 based on the suspension requests and based on a flow control algorithm.

The flow control signal 28 can be defined based on a flow control loop associated with the first stage of queues 310 (e.g., a first stage control loop). One or more flow control signals (not shown) can also be defined based on a flow control loop associated with the second stage of queues 320 and/or a flow control loop associated with the physical link 300.

Transmission of data associated with transmit queues within the first stage of queues 310 (other than transmit queue 312) is substantially unrestricted by flow control signal 28 because flow of data to the receive queues 342 and 346 is controlled based on the first stage flow control loop. For example, transmit queue 314 can continue to transmit data via transmit queue 322 even though transmission of data from transmit queue 312 is suspended. For example, transmit queue 314 can be configured to transmit data via transmission path 26, which includes transmit queue 322, to receive queue 348 even though transmission of data from transmit queue 312 via transmit queue 322 has been suspended. In some embodiments, transmit queue 322 can be configured to continue to transmit data to receive queue 342 from, for example, transmit queue 316 even though transmission of data from queue 312 via transmission path 22 has been suspended based on flow control signal 28.

If transmission of data to the receive queues 342 and 346 were instead suspended by controlling flow of data via transmit queue 322 based on a flow control signal (not shown) associated with the second stage control loop, transmission of data from transmit queue 314 and transmit queue 316 via transmit queue 322 would also be restricted (in addition to transmission of data from transmit queue 312). Transmission of data from transmit queue 322 could be suspended because it is associated with a specified level of service, and the data that caused, for example, congestion at receive queues 342 and 346 may be associated with that specified level of service.

One or more parameter values defined within the flow control signal 28 can be stored at a memory 352 of the destination control module 350. In some embodiments, the parameter value(s) can be stored at the memory 352 of the destination control module 350 after they have been defined and/or when the flow control signal 28 is sent to the source control module 360. A parameter value defined within the flow control signal 28 can be used to track a state of, for example, transmit queue 312. For example, an entry within the memory 352 can indicate that the transmit queue 312 is in a suspended state (e.g., a non-transmit state). The entry can be defined based on a suspension-time-period parameter value defined within the flow control signal 28. When the suspension time period has expired, the entry can be updated to indicate that the state of the transmit queue 312 has changed to, for example, an active state (e.g., a transmit state). Although not shown, in some embodiments, the parameter value(s) can be stored at a memory (e.g., a remote memory) outside of the destination control module 350.

In some embodiments, the parameter value(s) (e.g., state information defined based on the parameter value(s)) stored at the memory 352 of the destination control module 350 can be used by the destination control module 350 to determine whether or not an additional flow control signal (not shown) should be defined. In some embodiments, the parameter value(s) can be used by the destination control module 350 to define one or more additional flow control signals.

For example, if receive queue 342 is changed from an available state to an unavailable (e.g., a congestion state) in response to a first data packet received from transmit queue 312, a request to suspend transmission of data from transmit queue 312 can be communicated via the flow control signal 28. The flow control signal 28 can indicate, based on a queue identifier, that transmit queue 312 is a target of the request and can specify a suspension time period. The suspension time period and the queue identifier associated with transmit queue 312 can be stored in the memory 352 of the destination control module 350 when the flow control signal 28 is sent to the source control module 360. After the flow control signal 28 is sent, receive queue 344 can be changed from an available state to a congestion state in response to a second data packet received from transmit queue 312 (transmission path is not shown in FIG. 3). The second data packet can be sent from the transmit queue 312 before transmission of data from the transmit queue 312 is suspended based on flow control signal 28. The destination control module 350 can access the information stored in the memory 352 and can determine that an additional flow control signal targeted to transmit queue 312 should not be defined and sent to the source control module 360 in response to the change in state associated with receive queue 344 because flow control signal 28 has already been sent.

In some embodiments, the source control module 360 can be configured to suspend transmission from transmit queue 312 based on the most recent flow control signal parameter values. For example, after the flow control signal 28, which is targeted to transmit queue 312, has been sent to the source control module 360, a later flow control signal (not shown) targeted to transmit queue 312 can be received at the source control module 360. The source control module 360 can be configured to implement one or more parameter values associated with the later flow control signal rather than parameter values associated with flow control signal 28. In some embodiments, the later flow control signal can trigger the transmit queue 312 to remain in a suspended state for a longer or shorter period of time than indicated in the flow control signal 28.

In some embodiments, the source control module 360 can optionally implement one or more of the parameter values associated with the later flow control signal when a priority value associated with the parameter value(s) is higher (or lower) than a priority value associated with one or more of the parameter values associated with flow control signal 28. In some embodiments, each priority value can be defined at the destination control module 350 and each priority value can be defined based on a priority value associated with one or more of the receive queues 380.

In some embodiments, the flow control signal 28 and the later flow control signal (which are both targeted to transmit queue 312) can both be defined in response to the same receive queue from the receive queues 380 being unavailable. For example, the later flow control signal can include updated parameter values defined by the destination control module 350 based on receive queue 342 remaining in an unavailable state for a longer period of time than previously calculated. In some embodiments, the flow control signal 28 targeted to transmit queue 312 can be defined in response to one of the receive queues 380 changing state (e.g., changing from an available state to an unavailable state), and the later flow control signal targeted to transmit queue 312 can be defined in response to another of the receive queues 380 changing state (e.g., changing from an available state to an unavailable state).

In some embodiments, multiple flow control signals can be defined at the destination control module 350 to suspend transmissions from multiple transmit queues from the first stage of queues 310. In some embodiments, the multiple transmit queues can be transmitting data to a single receive queue such as receive queue 344. In some embodiments, a history of the flow control signals to the multiple transmit queues from the first stage of queues 310 can be stored in the memory 352 of the destination control module 350. In some embodiments, a later flow control signal associated with the single receive queue can be calculated based on the history of the flow control signals.

In some embodiments, suspension time periods that are associated with multiple transmit queues can be grouped and included in a flow control packet. For example, a suspension time period associated with transmit queue 312 and a suspension time period associated with transmit queue 314 can be included in a flow control packet (also can be referred to as a flow control packet). More details related to a flow control packet are described in connection with FIG. 4.

Figure 4:
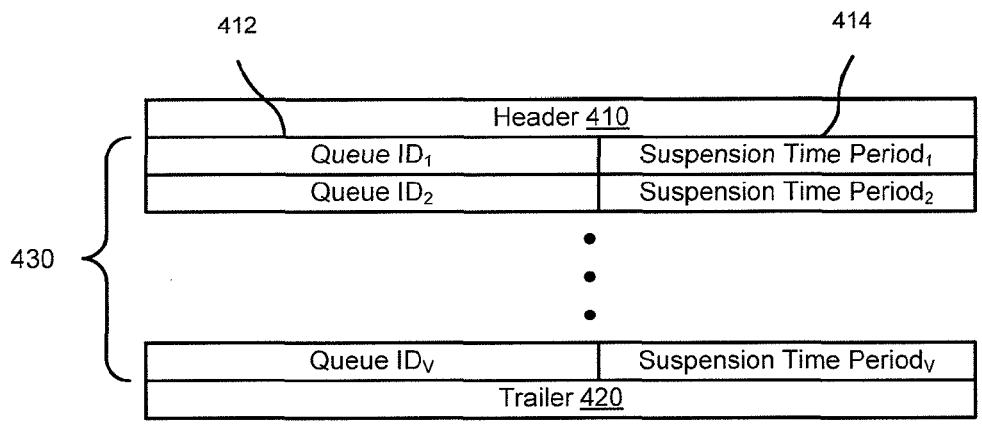
FIG. 4 is a schematic diagram that illustrates a flow control packet, according to an embodiment.

FIG. 4 is a schematic diagram that illustrates a flow control packet, according to an embodiment. The flow control packet includes a header 410, a trailer 420, and a payload 430 that includes suspension-time-period parameter values (shown in column 412) for several transmit queues represented by queue identifiers (IDs) (shown in column 414). As shown in FIG. 4, transmit queues represented by queue IDs 1 through V (i.e., Queue $ID_1$ through Queue $ID_V$) are each associated with a suspension-time-period parameter value 1 through V (i.e., Suspension Time Period$_1$ through Suspension Time Period$_V$). The suspension-time-period parameter values 414 indicate time periods during which transmit queues represented by the queue IDs 412 should be suspended (e.g., prohibited) from transmitting data.

In some embodiments, the flow control packet can be defined at, for example, a destination control module such as destination control module 350 shown in FIG. 3. In some embodiments, the destination control module can be configured to define a flow control packet at regular time intervals. For example, the destination control module can be configured to define a flow control packet every 10 ms. In some embodiments, the destination control module can be configured to define a flow control packet at random times, when a suspension-time-period parameter value has been calculated, and/or when a specified number of suspension-time-period parameter values have been calculated. In some embodiments, the destination control module can determine that at least a portion of the flow control packet should not be defined and/or sent, for example, based on one or more parameter values and/or state information accessed by the destination control module.

Although not shown, in some embodiments, multiple queue IDs can be associated with a single suspension-time-period parameter value. In some embodiments, at least one queue ID can be associated with a parameter value other than a suspension-time-period parameter value. For example, a queue ID can be associated with a flow rate parameter value. The flow rate parameter value can indicate a flow rate (e.g., a maximum flow rate) at which transmit queues (represented by the queue IDs) should transmit data. In some embodiments, the flow control packet can have one or more fields configured to indicate whether or not a particular receive queue is available to receive data.

The flow control packet can be communicated from the destination control module to a source control module (such as source control module 360 shown in FIG. 3) via a flow control signal (such as flow control signal 28 shown in FIG. 3). In some embodiments, the flow control packet can be defined based on a layer-2 (e.g., layer-2 of the opens systems interconnection (OSI) model) protocol. In other words, the flow control packet can be defined at and used within layer-2 of a network system. In some embodiments, the flow control packet can be transmitted between devices associated with layer-2 (e.g., a MAC device).

Referring back to FIG. 3, one or more parameter values (e.g., state information defined based on the parameter value (s)) associated with the flow control signal 28 can be stored in a memory 362 of the source control module 360. In some embodiments, the parameter value(s) can be stored at the memory 362 of the source control module 360 when the flow control signal 28 is received at the source control module 360. A parameter value defined within the flow control signal 28 can be used to track a state of one or more of the receive queues 380 (e.g., receive 342). For example, an entry within the memory 362 can indicate that receive queue 342 is unavailable to receive data. The entry can be defined based on a suspension-time-period parameter value defined within the flow control signal 28 and associated with an identifier (e.g., a queue identifier) of the receive queue 342. When the suspension time period has expired, the entry can be updated to indicate that the state of the receive queue 342 has changed to, for example, an active state. Although not shown, in some embodiments, the parameter value(s) can be stored at a memory (e.g., a remote memory) outside of the source control module 360.

In some embodiments, the parameter value(s) (and/or state information) stored at the memory 362 of the source control module 360 can be used by the source control module 360 to determine whether or not data should be transmitted to one or more of the receive queues 380. For example, the source control module 360 can be configured to transmit data from transmit queue 316 to receive queue 344 rather than receive queue 342 based on state information related to receive queue 344 and receive queue 342.

In some embodiments, the source control module 360 can analyze data transmission patterns to determine whether or not data should be transmitted from one or more of the source queues 370 to one or more of the receive queues 380. For example, the source control module 360 can determine based on parameter values stored at the memory 362 of the source control module 360 that transmit queue 314 is sending a relatively high volume of data to receive queue 346. Based on this determination the source control module 360 can trigger queue 316 to transmit data to receive queue 348 rather than receive queue 346 because receive queue 346 is receiving the high volume of data from transmit queue 314. By analyzing transmission patterns associated with the transmit queues 370 the onset of congestion at one or more of the receive queues 380 can be substantially avoided.

In some embodiments, the source control module 360 can analyze parameter values (and/or state information) stored at the memory 362 of the source control module 360 to determine whether or not data should be transmitted to one or more of the receive queues 380. By analyzing stored parameter values (and/or state information), the onset of congestion at one or more of the transmit queues 380 can be substantially avoided. For example, the source control module 360 can trigger data to be transmitted to receive queue 340 rather than receive queue 342 based on the historical availability of receive queue 340 compared with (e.g., being better than, being worse than) the historical availability of receive queue 342. In some embodiments, for example, the source control module 360 can transmit data to receive queue 342 rather than receive queue 344 based on the historical performance of receive queue 342 compared with the historical performance of receive queue 344 with respect to data bursts patterns. In some embodiments, the analysis of parameter values related to one or more of the receive queues 380 can be based on a particular time window, a particular type of network transaction (e.g., inter-processor communication), a particular level of service, and so forth.

In some embodiments, the destination control module 350 can send status information (e.g., current status information)

about the receive queues 380 that can be used by the source control module 360 to determine whether or not data should be transmitted from one or more of the source queues 370. For example, the source control module 360 can trigger queue 314 to transmit data to queue 344 rather than queue 346 because queue 346 has more available capacity than queue 344 as indicated by the destination control module 350. In some embodiments, any combination of current status information, transmission pattern analysis, and historical data analysis can be used to substantially prevent, or reduce the likelihood of the onset of congestion of one or more of the receive queues 380.

In some embodiments, the flow control signal 28 can be sent from the destination control module 350 to the source control module 360 via an out-of-band transmission path. For example, the flow control signal 28 can be sent via a link dedicated to communications related to flow control signaling. In some embodiments, the flow control signal 28 can be transmitted via queues associated with the second stage of queues 320, queues associated with the first stage of queues 310, and/or the physical link 300.

Figure 5:
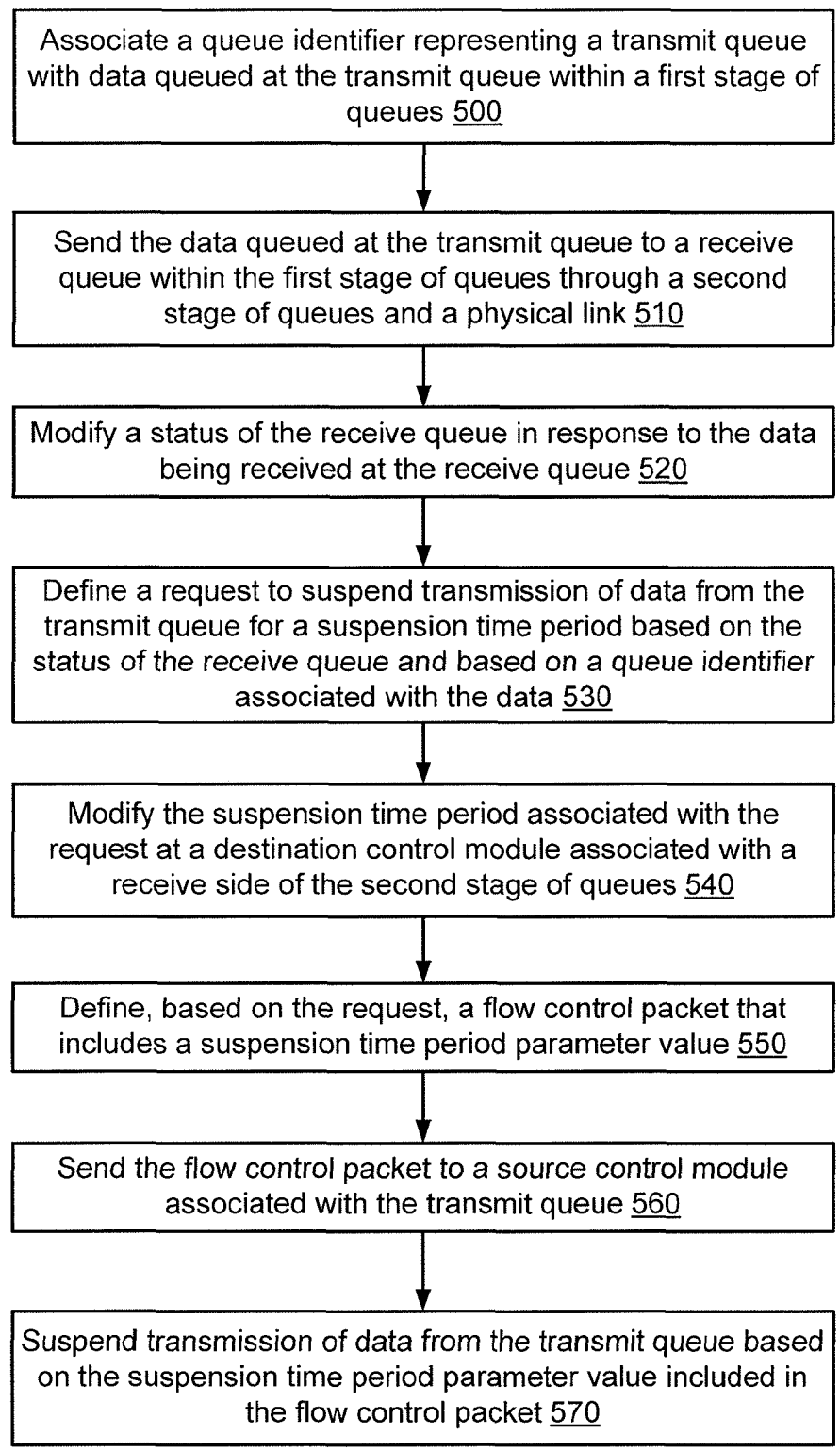
FIG. 5 is a flowchart that illustrates a method for defining a flow control packet, according to an embodiment.

FIG. 5 is a flowchart that illustrates a method for defining a flow control packet, according to an embodiment. As shown in FIG. 5, data queued at a transmit queue within a first stage of queues is associated with a queue identifier representing the transmit queue, at 500. In some embodiments, the queue identifier can be appended to the data or included in a portion of a field associated with the data.

The data queued at the transmit queue is sent to a receive queue within the first stage of queues through a second stage of queues and a physical link, at 510. In other words, the data is sent from the transmit queue to the receive queue via a transmission path that includes not only the transmit queue and the receive queue, but also at least one queue from the second stage of queues and the physical link. The second stage of queues can be disposed between the first stage of queues and the physical link. A transmit side of the first stage of queues can be associated with a switch core of a data center and the receive side of the first stage of queues can be associated with a network entity at the edge of the data center, and vice versa. The first stage of queues can be associated with a first stage control loop and the second stage of queues can be associated with a second stage control loop. In some embodiments, the physical link can be associated with a physical link control loop.

A status of the receive queue is modified in response to the data being received at the receive queue, at 520. In some embodiments, the status of the receive queue can be changed from an available state to a congestion state in response to the data being received at the receive queue. In some embodiments, the status of the receive queue can be changed from an available state to a congestion state (by a destination control module) in response to more than one receive queue (or a specified subset of receive queues) within a stage being in a congestion state.

A request to suspend transmission of data from the transmit queue for a suspension time period is defined based on the status of the receive queue and based on the queue identifier, at 530. The request to suspend transmission can include the queue identifier so that the transmit queue can be identified as the target of the request to suspend. In some embodiments, the request to suspend transmission can be defined based on the status of the receive queue changing to an inactive state or a disabled state. In some embodiments, the suspension time period can be defined based on a flow rate of data from the receive queue.

The suspension time period associated with the request is modified at a destination control module associated with a receive side of the second stage of queues, at 540. The suspension time period for the transmit queue can be modified based on multiple requests to suspend transmission of data from the transmit queue. In some embodiments, the suspension time period can be modified at a portion of the destination control module configured to define a suspension-time-period parameter value for the transmit queue based on multiple requests to suspend transmission of data from the transmit queue. In some embodiments, the destination control module can be associated with a different portion of the receive side that may not include the second stage of queues. In some embodiments, the request to suspend can be denied.

A flow control packet that includes a parameter value representing the suspension time period is defined based on the request, at 550. In some embodiments, the flow control packet can include suspension-time-period parameter values associated with multiple queue identifiers.

The flow control packet is sent to a source control module associated with the transmit queue, at 560. In some embodiments, the flow control packet can be sent at a scheduled time or at a time specified at the source control module associated with the receive side of the second stage of queues. In some embodiments, the flow control packet can be sent via a flow control signal and/or can be sent via an out-of-band transmission path.

Transmission of data from the transmit queue within the first stage of queues is suspended based on the suspension-time-period parameter value included in the flow control packet, at 560. In some embodiments, the suspension time period can be decreased by a flow control signal (e.g., a different flow control packet) received at the source control module after the flow control packet is received at the source control module.

Figure 6:
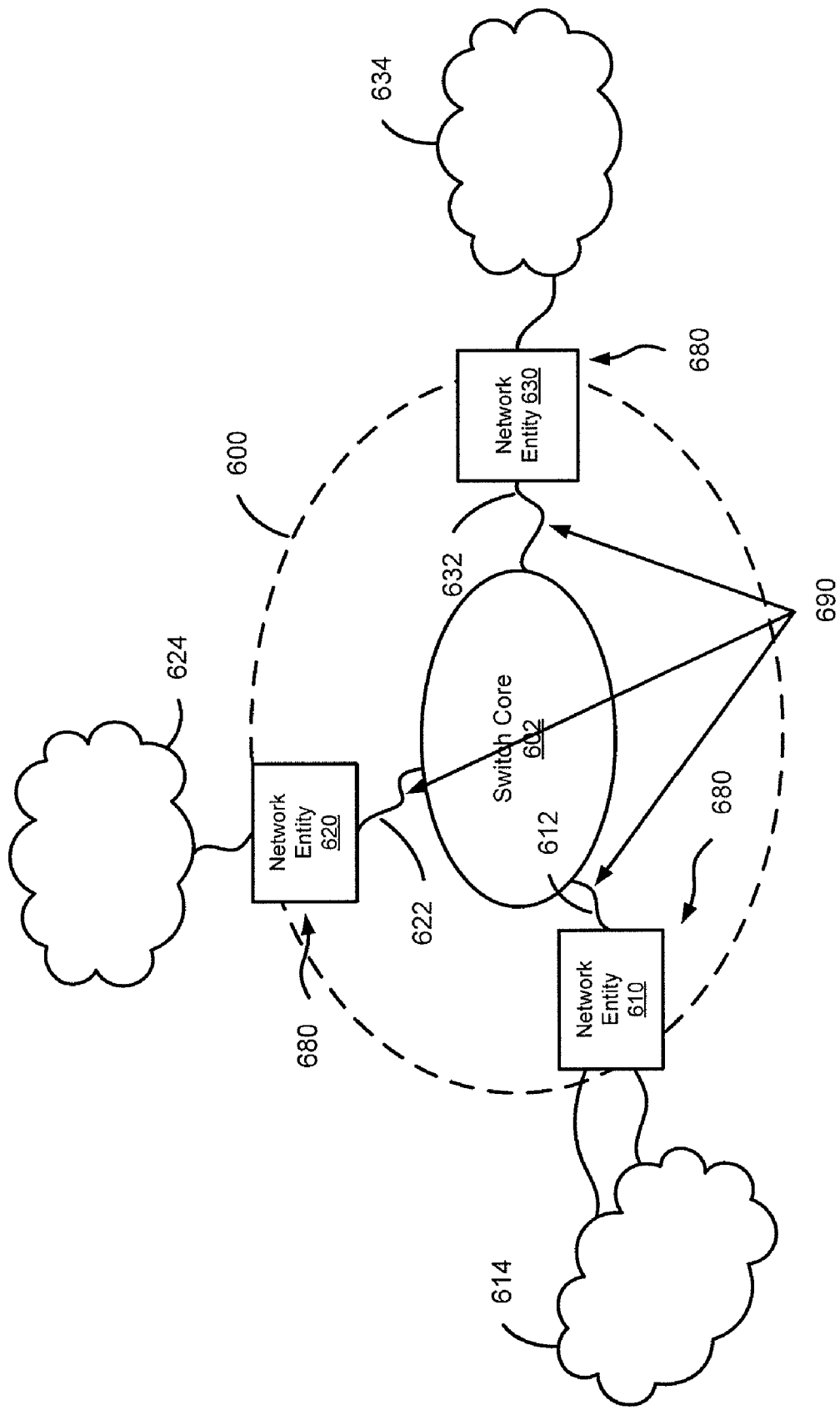
FIG. 6 is a schematic block diagram that illustrates a data center, according to an embodiment.

FIG. 6 is a schematic block diagram that illustrates a data center 600, according to an embodiment. The data center 600 includes network entity 610, network entity 620, and network entity 630 (collectively referred to as network entities 680), which are each in communication with a switch core 602 via at least one of the physical links 690. For example, network entity 630 can be configured to transmit data to and/or receive data from the switch core 602 via physical link 632. When network entity 630 transmits data via the physical link 632, network entity 630 can be referred to as a transmitter disposed on a transmit side of the physical link 632. Switch core 602 can be configured to receive the data and can be referred to as a receiver disposed on a receive side of the physical link 632. Conversely, switch core 602 can also be configured to transmit data as a transmitter, and network entity 630 can be configured to receive the data as a receiver.

Flow of data via each of the physical links 690 (physical link 612, physical link 622, and/or physical link 632) can be controlled based on more than one flow control loop such as those described in connection with FIGS. 1 through 5. The flow control loops can be associated with the physical links 690 and/or multiple stages of queues within portions of the data center 600. For example, a flow control loop can be associated with physical link 622 and at least one flow control loop can be associated with each of several stages of queues spanning the physical link 622.

In some embodiments, each stage of queues can have a first portion of queues on one side (e.g., a transmit side) of the physical link 622 and a second portion of queues on another side (e.g., a receive side) of the physical link 622. For example, although not shown, a first queue within a stage of queues can be included in network entity 610 on one side of the physical link 612, and a second queue within the stage of queues can be included in the switch core 602 on another side of the physical link 612. A flow control loop can be associated with the first queue within the stage of queues included in the network entity 610 and the second queue within the stage of queues included in the switch core 602.

For example, if the first queue (the receive queue) is unable to handle data transmitted from the second queue (the transmit queue), a flow control module associated with the first queue can send a flow control signal configured to trigger suspension of transmission of data from the second queue to the first queue. The second queue can be identified within the flow control signal based on a queue identifier associated with the second queue.

As shown in FIG. 6, network entity 610, network entity 620, and network entity 630 are at the edges of the data center 600 and function as gateways to network 614, network 624, and network 634, respectively. Networks 614, network 624, and/or network 634 can be, for example, a virtual network, a local area network (LAN) and/or a wide area network (WAN), and can include one or more wired and/or wireless segments.

The switch core 602 of the data center 600 can be a switch fabric that has multiple stages (e.g., an ingress stage, an egress stage, a middle stage) through which data can be routed. In some embodiments, the switch core 602 can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, the switch core 602 can be defined by one or more multi-stage switches (not shown) that each include one or more switch fabrics.

Figure 7:
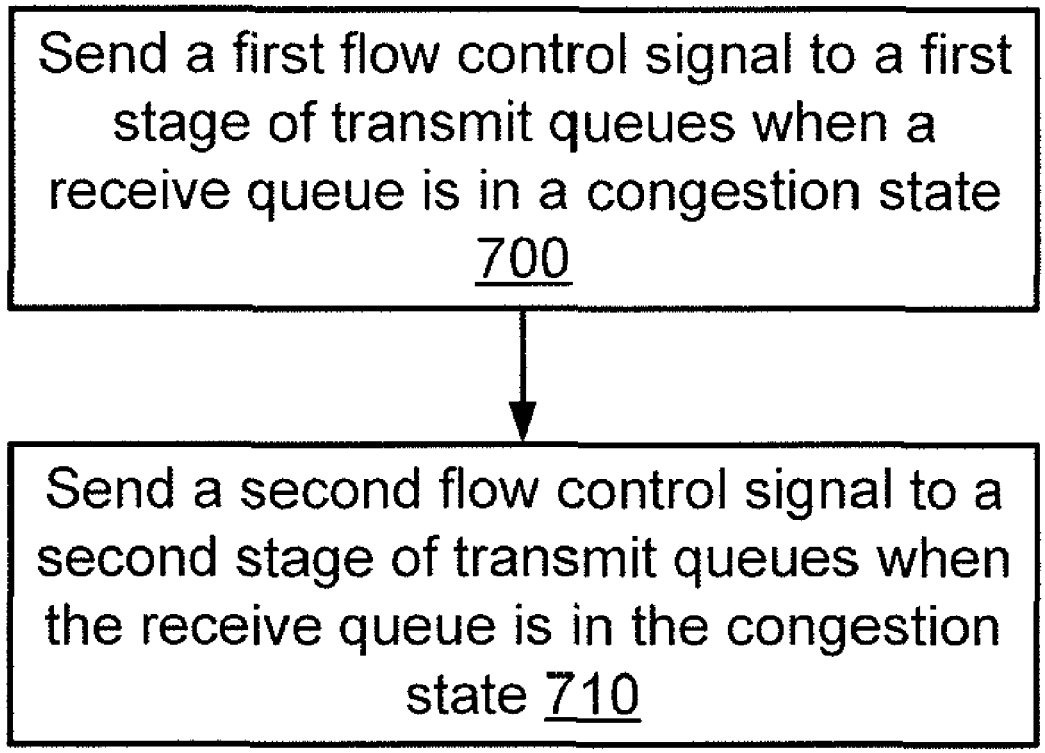
FIG. 7 is a flowchart that illustrates a method for sending flow control signals to two different stages of queues, according to an embodiment.

FIG. 7 is a flowchart that illustrates a method for sending flow control signals to two different stages of queues, according to an embodiment. As shown in FIG. 7, a first flow control signal is sent to a first stage of transmit queues when a receive queue is in a congestion state, at 700. In some embodiments, the first flow control signal can be sent in response to an indicator that the receive queue is in the congestion state. In some embodiments, the indicator can be referred to as a congestion indicator. In some embodiments, a status of the receive queue can be changed from an available state to the congestion state in response to a portion of data sent from the first stage of transmit queues. In some embodiments, the first flow control signal can be associated with a first flow control loop.

A second flow control signal is sent to a second stage of transmit queues when the receive queue is in the congestion state, at 710. In some embodiments, the second flow control signal can be sent in response to the indicator that the receive queue is in the congestion state. In other words, the indicator that triggers sending of the second flow control signal can be the same as the indicator that triggers sending of the first flow control signal. In some embodiments, the sending of the first flow control signal and the sending of the second flow control signal can be triggered by a different indicators. In some embodiments, a status of the receive queue can be changed from an available state to the congestion state in response to a portion of data sent from the second stage of transmit queues. In some embodiments, the second flow control signal can be associated with a second flow control loop different than a first flow control loop associated with the first flow control signal.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a source entity and/or a destination entity can have more than two flow-controllable stages of queues that span a physical link.

What is claimed is:

1. A method, comprising:
receiving at a first flow control module at a receive side of a physical link a first request to suspend transmission of a first data from a queue within a transmit side of a first stage of queues and to suspend transmission via a path including the physical link, a portion of the first stage of queues, and a portion of a second stage of queues;
receiving a second request at the first flow control module to suspend transmission of at least a portion of a second data queued at the queue within the transmit side of the first stage of queues;
defining a suspension time value based on the first request and based on the second request, the suspension time value representing a period of time for suspending transmission of the first data and the second data from the queue within the transmit side of the first stage of queues; and
sending from the first flow control module, in response to the first request and the second request, a flow control signal to a second flow control module configured to schedule transmission of the first data from the queue within the transmit side of the first stage of queues, the flow control signal being associated with a first control loop including the path and differing from a second control loop that excludes the first stage of queues, the flow control signal including the suspension time value.

2. The method of claim 1, wherein the second flow control loop is a priority-based flow control loop.

3. The method of claim 1, wherein the physical link is included in a third flow control loop different than the first flow control loop and different than the second flow control loop.

4. The method of claim 1, wherein the first data is queued at the queue within the transmit side of the first stage of queues, the request to suspend transmission includes an identifier associated with the queue within the transmit side of the first stage of queues.

5. The method of claim 1, wherein the queue within the transmit side of the first stage of queues is included in a plurality of transmit queues included in the first stage of queues, the portion of the second stage of queues includes a transmit queue, the plurality of transmit queues included in the first stage of queues fans into the transmit queue included in the second stage of queues.

6. The method of claim 1, wherein the queue within the transmit side of the first stage of queues is a virtual queue, the flow control signal includes an identifier associated with the virtual queue.

7. A processor-readable non-transitory medium storing code representing instructions to cause a processor to perform a process, the code comprising code to:
include an identifier of a transmit queue within a data packet received at the transmit queue, the transmit queue being disposed on a transmit side of a physical link;
send the data packet to a receive queue via a transmission path that includes the transmit queue, the physical link, the receive queue, and a pair of queues disposed within the transmission path between the receive queue and the transmit queue;
receive from a receive side of the physical link a first flow control signal defined in response to the data packet being received at the receive queue, the first flow control signal including the identifier of the transmit queue and a first suspension time value associated with the identifier of the transmit queue;
receive from the receive side of the physical link a second flow control signal including a second suspension time value associated with the identifier of the transmit queue; and
define a third suspension time value based on the first suspension time value and the second suspension time value.

8. The processor-readable non-transitory medium of claim 7, wherein the transmit queue and the receive queue are included in a first stage of queues, the pair of queues is included in a second stage of queues mutually exclusive from the first stage of queues.

9. The processor-readable non-transitory medium of claim 7, wherein the transmit queue and the receive queue are included in a first stage of queues, the pair of queues is included in a second stage of queues mutually exclusive from the first stage of queues, the flow control priority is included in a first plurality of flow control priorities associated with the second stage of queues, the first stage of queues is associated with a second plurality of flow control priorities different than the first plurality of flow control priorities.

10. The processor-readable non-transitory medium of claim 7, wherein the transmit queue is included in a plurality of transmit queues that fan into a queue from the pair of queues, the first flow control signal and the second flow control signal are configured to trigger suspension of data transmissions from less than all transmit queues included in the plurality of transmit queues.

11. A method, comprising:
receiving a first request to suspend transmission of a first data queued at a first stage of queues, the request associated with the first data being defined based on an availability of a first receive queue included in the first stage of queues, the first data being queued for transmission via a transmission path including a physical link and a portion of a second stage of queues disposed within the transmission path between the physical link and the first stage of queues, the second stage of queues including a transmit queue;
receiving a second request to suspend transmission of a second data queued at the first stage of queues, the request associated with the second data being defined based on an availability of a second receive queue included in the first stage of queues, the second data being queued for transmission via the transmission path; and
defining a flow control signal based on the first request and based on the second request, configured to trigger suspension of transmission of at least one of the first data or the second data such that data flow via the transmit queue included in the second stage is modified.

12. The method of claim 11, wherein the first data is queued at a transmit queue included in the first stage of queues, the second data is queued at the transmit queue included in the first stage of queues, the defining includes defining a suspension time value for the transmit queue included in the first stage of queues based on the first request and based on the second request.

13. The method of claim 11, wherein the defining includes defining a suspension time value, the suspension time value is encoded in the flow control signal based on a layer-2 protocol.

14. The method of claim 11, wherein the first request includes a first suspension time value, the second request includes a second suspension time value different than the first suspension time value, the defining being performed in response to a condition associated with a comparison of the first suspension time value and the second suspension time value being satisfied.

15. The method of claim 11, wherein the second stage of queues is a flow-controllable stage of queues, the physical link is a flow-controllable link.

16. The method of claim 1, wherein the suspension time value is an average of a time period associated with the first request and a time period associated with the second request.

17. The method of claim 1, wherein the suspension time value is a time period associated with the first request when a time period associated with the first request is greater than a time period associated with the second request.

18. The method of claim 1, wherein the defining is delayed for a wait time period, the receiving the first request and the receiving the second request being within the wait time period.

19. The method of claim 1, wherein the flow control signal is a first flow control signal, the method further comprising:
storing an indication of the first flow control signal;
receiving a third request at the first flow control module to suspend transmission of at least a portion of a third data queued at the queue within the transmit side of the first stage of queues; and
determining to not send a second flow control signal based on the suspension time value and the indication of the first flow control signal.

* * * * *